Jan. 12, 1932.   I. B. WINSOR ET AL   1,840,993
ELECTROMAGNETIC MOTOR
Filed Dec. 13, 1929   2 Sheets-Sheet 2
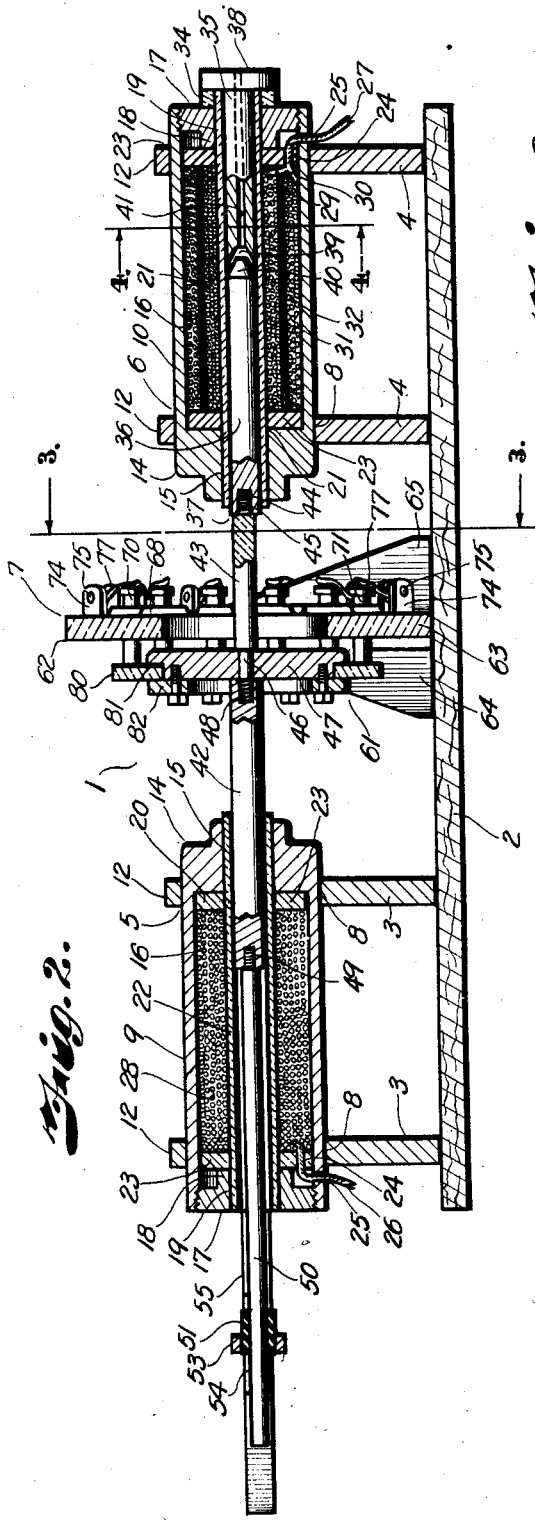
INVENTOR
*Irwin B. Winsor*
and *Moses A. Deal*
BY
ATTORNEY Patented Jan. 12, 1932

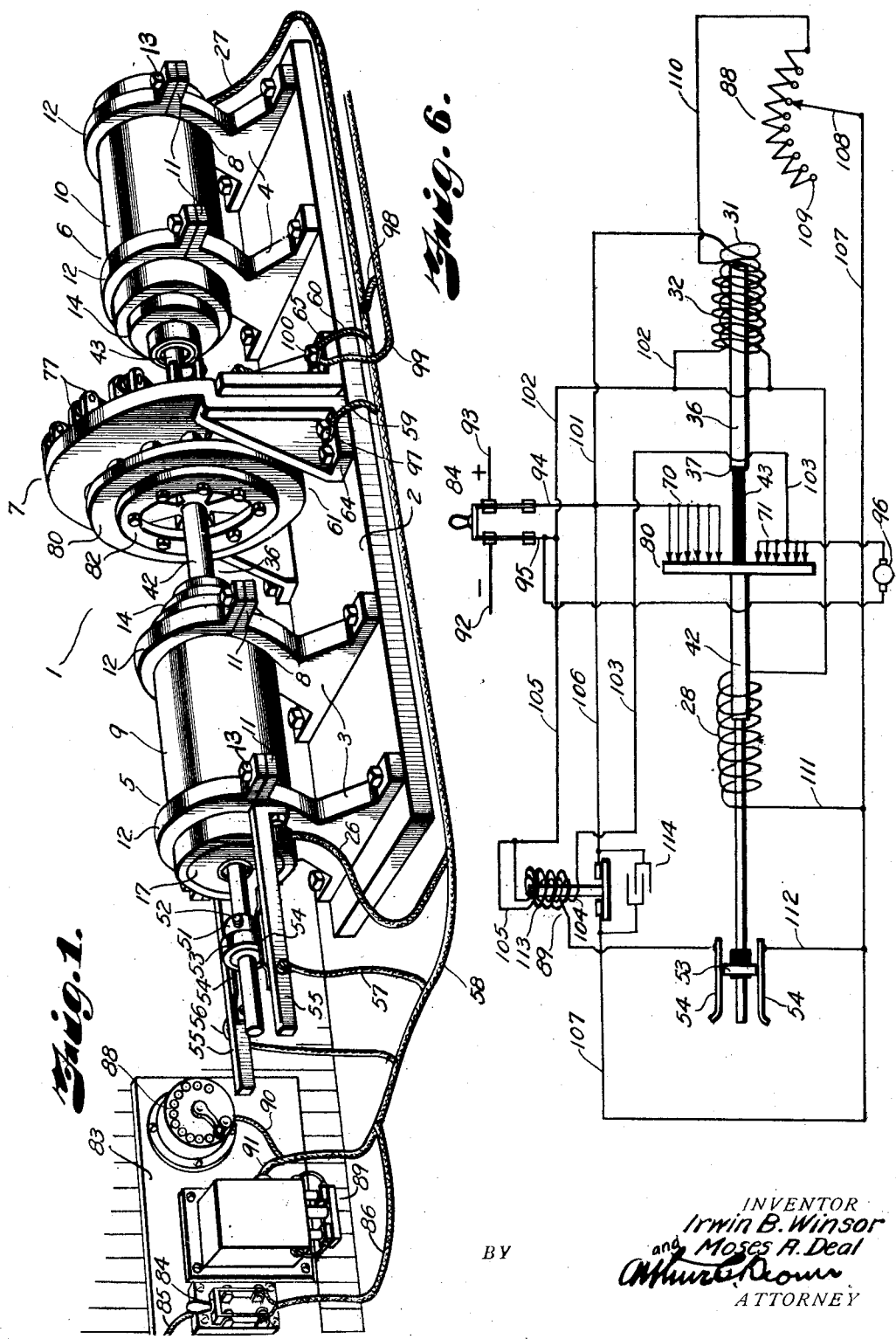

1,840,993

UNITED STATES PATENT OFFICE

IRWIN B. WINSOR AND MOSES A. DEAL, OF TULSA, OKLAHOMA; SAID DEAL ASSIGNOR TO SAID WINSOR

ELECTROMAGNETIC MOTOR

Application filed December 13, 1929. Serial No. 413,751.

Our invention relates to electro-magnetic motors of the reciprocating type including switch mechanism for controlling the motor and other intermittently actuated electrical apparatus which may be operated thereby; the principal object of the invention being to prevent formation of electric arcs in the switch mechanism incident to the opening and closing of the electric circuit, thereby permitting the use of comparatively high voltages for increasing the usefulness and efficiency of the motor.

A further object of the invention is to provide for direct operation of reciprocatory pumps or similar apparatus from the plunger of the motor.

In accomplishing these and other objects of the invention, we have provided improved details of structure, the preferred form of which is illustrated in the accompanying drawings, wherein:

Fig. 1 is a perspective view of the motor connected in circuit with complementary control apparatus.

Fig. 2 is a central, longitudinal section through the motor showing the reciprocating plunger at one end of its stroke, and the switch mechanism closed for reversing the stroke.

Fig. 3 is a transverse section on the line 3—3, Fig. 2, showing the arrangement of the switch contact members on their supporting plates.

Fig. 4 is an enlarged transverse section through one of the solenoid units of the motor on the line 4—4, Fig. 2.

Fig. 5 is an enlarged section on the line 5—5, Fig. 3.

Fig. 6 is a circuit diagram showing the switches closed, with the plunger at the end of its stroke as shown in Fig. 2.

Referring in detail to the drawings:

1 designates the motor including an insulator base 2 fitted at opposite ends with pairs of spaced standards 3 and 4 for the mounting of solenoid units 5 and 6, and supported by the base between the pairs of standards is a switch mounting frame 7.

Each of the standards 3 and 4 includes a semi-circular seat 8 forming a saddle to receive the tubular housing members 9 and 10 of the solenoid units 5 and 6, and extending laterally from the standards are ears 11 for attaching clamp members 12 to secure the housing members in their seats and in axial alignment on the base, the clamping members being secured by bolts 13 extending through the ears 11.

The housing members 9 and 10 are identical in construction, each including inwardly facing head portions 14 having a central bore 15 communicating with an enlarged bore 16. The bores 16 are threaded at their outer end for receiving removable disks or closure members 17, as shown in Fig. 2.

Formed on the inner sides of the closure members 17 are concentric bosses 18 having central openings 19 positioned in axial alignment with the bores 15 for mounting spools 20 and 21 in the housing members 9 and 10, respectively.

The spools 20 and 21 are constructed of nonmagnetic material and include sleeve portions 22 fitted with magnetic end flanges 23 abutting respectively with the head portions 14 and with the bosses 18 of the closure members. The outer flanges 23 are provided with apertures 24 communicating with annular recesses 25 formed between the flanges and the disks 18 for receiving conduits 26 and 27. The conduit 26 is connected with a solenoid coil 28 wound on the spool 20 between the flanges, and the conduit 27 includes branches 29 and 30 connected respectively with a solenoid coil 31 wound on the spool 21 and with a demagnetizing coil 32 wound over the coil 31. The coil 32 is wound reversely to the coil 31, and when energized by the flow of electric current, is adapted for neutralizing the electro-magnetic force of the solenoid coil 31, as later described in the operation of the motor.

The outer end of the spool member 21 preferably protrudes from the closure member 17 to support a spacer collar 34 and mounted in the outer end of the spool is a removable plug 35 cooperating with the magnetic section 36 of an armature or plunger 37 which is reciprocably mounted in the sleeves of the spool. The outer end of the plug member is provided with a head 38 abutting with the spacer collar 34 and its inner end terminates substantially midway of the spool member, and is provided with a conical recess 39 to receive the conical end 40 of the plunger section 36; the conical end of the plunger tending to converge lines of magnetic force toward the axial center of the spool member and increase the power of the magnet. Communicating with the recess 39 is a through longitudinal port 41 for relieving compression in the spool member 21 incident to reciprocation of the plunger.

The plunger 37 also includes a magnetic section 42 slidable in the spool member 20 and connected with the section 36 by a nonmagnetic connector 43. The connector 43 is provided with a reduced threaded end 44 engaging a threaded opening 45 in the plunger section 36, and a reduced threaded shank 46 extending centrally through a connector mounting plate 47 and engaged in a threaded opening 48 of the plunger section 42; the plate being clamped between the plunger section 42 and the shouldered portion of the connector.

Threadedly engaged in an opening 49 in the outer end of the plunger section 42 is a connecting rod 50 projecting from the spool 20 and fitted with an insulator sleeve 51 that is adjustably secured on the rod by a set screw 52 for a purpose later described, the outer end of the rod being adapted for connection with a pump or like apparatus (not shown) which may be operated by the motor.

Fixed on the sleeve 51 is a metallic contact collar 53 slidable between a pair of stationary contact strips 54 supported on a pair of insulator brackets 55 extending outwardly from one of the standards 3.

Leading from the contact strips 54 are branch conduits 56 and 57 connecting with a conduit 58 carrying branch conduits 59 and 60 connected with a switch 61 including the mounting frame 7, now described.

The switch mounting frame 7 includes upper and lower segmental plates 62 and 63 provided with foot portions 64 and 65 secured on the insulator base 2 as shown in Fig. 1. The segment plate 62 is offset on its foot portion 64 so that it lies in the plane of the lower segment plate 63 and with its lower edge 66 (Fig. 3) spaced above the upper edge 67 of the segment plate 63 to provide separation of the plates since the plates must be insulated from each other.

Located on the sides of the segmental plates 62 and 63 opposite the mounting plate 47 is a series of radially spaced bosses 68 provided with openings 69 slidably receiving carbon contact sets 70 and 71 arranged on their respective plates and fitted with collars 72, electrically connected with the plates by flexible connectors 73.

Located on the segment plates in radial spaced relation with each of the bosses 68 are paired ears 74 fitted with pins 75 preferably riveted in the ears and provided with slots 76 for receiving bent ends of coiled flat springs 77 having free opposite ends 78 resting on the protruding ends 79 of the contact members for yieldingly retaining the contact members for engagement with a contact ring 80 on the plunger 37.

The contact ring 80 is clamped against a shouldered portion 81 of the mounting plate 47 by a clamping ring 82 and is moved by the plunger 37 relative to the segmental plates, whereby the sets of contacts in the upper plate are connected with the set in the lower segment plate to close an electric circuit hereafter described.

Connected in circuit with the assembled motor and located on a suitable panel 83 is a knife switch 84 connected with a main feed line extending through a conduit 85 and with feed lines in a conduit 86 connected with the conduit 58. Located on the panel with the switch 84 is a rheostat controller 88 and a relay switch 89 connected to the circuit through wires in conduits 90 and 91.

Referring now to the wiring diagram (Fig. 6) showing the electrical connections for the motor and its various controls:

92 and 93 designate the main feed lines of electrical supply which are from a source connected to the switch 84, and connected with the feed lines through the switch are branch wires 94 and 95, the branch 94 being connected with the segment plate 62, and the branch 95 in series to certain electric apparatus such as a motor designated 96 and with the segment plate 63 so that when the ring 80 contacts the carbons an electric circuit is established through the plates to actuate the motor or other apparatus 96. The wire 94 extends through the conduits 86, 58, 59, Fig. 1, and is grounded to a bolt 97 securing the plate 62 to the base, and the wire 95 extends through conduits 86, 58 and branch conduits 98 and 99, and is grounded by a similar bolt 100 to the segment 63.

Leading from the branch 94 is a line 101 connected with the solenoid coil 31, and leading from the coil is a line 102 connected with the branch 95 for completing a circuit whereby electric current may flow through the coil 31 continuously when the knife switch is closed for magnetizing the coil and attracting the plunger 37.

Connected in circuit with contacts 71 is a line 103 extending through conduits 60, 58, 91 to connect with a solenoid coil 104 of the relay switch 89, and with a line 105 leading to the branch 95 for completing the circuit and energizing the coil 104 when the contact ring 80 of the distributor switch is engaged with the contacts 70 and 71. Energizing of the coil 104 closes the relay switch 89 and connects a line 106 leading from the branch 94 with a line 107 terminating in the movable contact arm 108 of the rheostat controller 88.

Connected with the resistance contacts 109 of the rheostat 88 is a line 110 leading to the demagnetizing coil 32, which is connected with the line 102 for completing the circuit to the branch 95.

Leading from the line 107 is a line 111 connecting the solenoid coil 28 in circuit with the demagnetizing coil 32, whereby the coils 28 and 32 may be simultaneously energized when the contact ring 80 is moved into engagement with the contacts 70 and 71 for closing the relay switch 89 connecting the lines 106 and 107 of the circuit. Energizing of the coil 32 causes demagnetization of the coil 31, thereby permitting the magnetized coil 28 to attract the plunger 37 from the coil 31.

Leading from the line 107 is a line 112 including the contact strips 54 engageable with the contact collar 53 on the plunger 37 for closing a circuit through a holding coil 113 wound over the coil 104 of the relay switch 89. The holding coil is adapted for holding the relay switch closed temporarily after disengagement of the contact ring 80 from the contacts 70 and 71 as the plunger moves toward the magnet 28, thereby maintaining the solenoid coil 28 and demagnetizing coil 32 in a closed circuit for completing the plunger stroke. The stroke of the plunger may be determined by the location of the collar 53 on the plunger relative to the outward ends of the contact strips for as soon as the collar leaves the contact strips the circuit in the holding coil is broken which opens the relay switch and de-energizes the magnet 28.

Connected with the lines 106 and 107 across the relay switch 89 is a fixed condenser 114 for preventing electric flashes or arcs between the contacts of the relay switch when the motor is in operation.

With the motor constructed and assembled as described, its operation is as follows:

In starting the motor with the parts in the position indicated in Figs. 2 and 6, the knife switch 84 is closed, energizing the coil 31 through the lines 94, 101, 102 and 95. Current also flows through the contacts 70 and 71, energizing the relay coil 104 to close the relay switch 89 which energizes the coil 28 through current in lines 94, 106, 107, 111 and 102, and the coil 32 is energized by current flowing through lines 94, 106, and 107, rheostat 88, wires 110, 102 and 95. The rheostat controller arm 108 is then moved from the contact point 109 of greatest resistance to a point of less resistance for decreasing the resistance to the flow of electric current to the demagnetizing coil 32, consequently increasing the demagnetizing influence of the coil 32 over the constantly energized solenoid coil 31.

Since the magnetic force in the solenoid coils 28 and 31 is equal when the rheostat arm 108 is engaged with the contact point 109 of the greatest resistance, it is apparent that the equal magnetic forces exerted at opposite ends of the plunger will prevent longitudinal movement of the plunger in either direction, but when the arm 108 is shifted to a point of less resistance, the increased flow of electric current to the demagnetizing coil 32 demagnetizes and reduces the magnetic force of the solenoid coil 31 to a point below the force of the solenoid coil 28, so that the greater attracting force of the coil 28 causes the plunger to be drawn from the coil 31.

During the initial movement of the plunger 37 toward the solenoid coil 28, the contact ring 80 is disengaged from the contacts 70 and 71, consequently breaking the circuit to electrical apparatus 96.

Simultaneously with the breaking of the circuit through the line 94, the circuit through the solenoid coil 104 of the relay switch 89 is also broken; however, the holding coil 113 remains in a closed circuit as the contact collar 53 slides between the contact strips 54, and serves to supplant the coil 104 for retaining the relay switch closed until the collar 53 emerges from its engagement with the contact strips to break the circuit.

When the contact collar 53 is disengaged from the contact strips, the relay switch 89 opens, causing the circuits to the solenoid coil 28 and demagnetizing coil 32 to be opened, thereby de-energizing the coils and permitting the energized solenoid coil 31 to reverse the movement of the plunger 37.

As the plunger 37 moves toward the solenoid coil 31, the contact collar 53 reengages the contact strips 54 and the contact ring 80 reengages the sets of contacts 70 and 71 at the end of the stroke, reestablishing the circuits to the coil 104 of the relay switch 89 and to the electrical apparatus 96.

As the circuit is closed to the coil 104 of the relay switch, the switch is closed for reestablishing the circuit to the solenoid coil 28 and demagnetizing coil 32 for again reversing the stroke of the plunger as heretofore described.

By providing the non-magnetic spacer collar 34 between the head 38 of the plug 35 and the closure member 17 of the housing 10, a magnetic leakage is effected between the head 38 and the closure member 17 of the housing for decreasing the magnetic force between the inner end of the plug and the head 40 of the plunger section 36 for accelerating disengagement of the contact ring from the contacts 70 and 71 during the reversal of the plunger stroke toward the solenoid coil 28.

In regulating the stroke of the plunger 37, the contact collar 53 is adjusted on the connecting rod 50 of the plunger relative to the outer ends of the contact strips 54 for effecting a greater or less contact engagement of the collar 53 with the contact strips, thereby retaining the holding coil 113 in a closed circuit for periods of greater or less duration after disengagement of the contact ring 80 from the sets of contacts 70 and 71 of the distributor switch.

In regulating the reciprocatory speed of the plunger 36, the rheostat 88 is adjusted for applying a greater or less resistance in the demagnetizing coil 32 for accordingly increasing or reducing the magnetic force of the solenoid coil 31 which resists movement of the plunger toward the solenoid coil 28 when the motor is in operation.

It will also be apparent that the reciprocatory speed of the plunger may be increased by shortening of the plunger stroke, and correspondingly reduced by lengthening of the stroke.

From the foregoing description, it will be apparent that the multiple contacts of the distributor switch adapt the motor for use with comparatively high voltages and render the motor highly efficient for controlling electric signs or the like, and useful for direct operation of pumps or other similar apparatus.

What we claim and desire to secure by Letters Patent is:

1. A motor of the character described, including a solenoid, an armature operable by the solenoid, an electric circuit for energizing the solenoid, a relay circuit for controlling the energizing circuit, a switch operable by the armature to initially close the relay circuit for closing the energizing circuit, and means for maintaining the solenoid circuit closed during reciprocation of the armature.

2. A motor of the character described including a solenoid, an armature operable by the solenoid, an electric circuit for energizing the solenoid, a relay circuit for controlling the energizing circuit, a switch operable by the armature for initially closing the relay circuit, and a second switch controlled by the armature for maintaining the relay circuit closed during reciprocation of the armature.

3. A motor of the character described including spaced electromagnets, a plunger reciprocable by the magnets, circuits for energizing the magnets, a demagnetizing coil for one of the magnets, a relay circuit controlling the demagnetizing coil and the other magnet, a switch operable by the plunger for initially closing the relay circuit, and a second switch controlled by the plunger for maintaining the relay circuit closed during movement of the plunger.

4. A motor of the character described including electromagnets, a plunger reciprocable by the magnets, circuits for energizing the magnets, a demagnetizing coil in the circuit of one of the magnets for demagnetizing the other magnet, a relay controlling the circuit containing the demagnetizing coil, a switch operable by the plunger for initially closing the relay circuit, and a second switch controlled by the plunger for maintaining the relay circuit closed during movement of the plunger.

5. A motor of the character described including an electromagnet, a plunger reciprocable by the magnet, a circuit for energizing the magnet, a relay controlled switch in the circuit, a circuit for operating the relay, a set of contacts connected with a source of current supply, a second set of contacts connected with the relay circuit, and a contactor on the plunger to connect the contacts and energize the relay for closing the energizing circuit to move the plunger in one direction, and means for moving the plunger in the opposite direction.

6. A motor of the character described including an electromagnet, a plunger reciprocable by the magnet, a circuit for energizing the magnet, a relay circuit for controlling the magnet circuit, a set of contacts connected with a source of current supply, a second set of contacts connected with the relay circuit, a contactor on the plunger to connect the contacts to energize the relay for energizing the magnet circuit to move the plunger in one direction, and means for moving the plunger in the opposite direction.

7. A motor of the character described including an electromagnet, a plunger reciprocable by the magnet, a circuit for energizing the magnet, a switch in the circuit, a relay circuit for the switch, a set of contacts connected with a source of current supply, a second set of contacts connected with the relay circuit, and a contactor on the plunger adapted to connect the contacts and energize the relay for closing the circuit to the magnet to move the plunger in one direction, and electrically operated means for moving the plunger in the opposite direction.

8. A motor of the character described including an electromagnet, a plunger reciprocable by the magnet, a circuit for energizing the magnet, a relay controlled switch in the circuit, a circuit for operating the relay, a set of contacts connected with a source of current supply, a second set of contacts connected with the relay circuit, and a contactor on the plunger to connect the contacts when the plunger moves in one direction for initially energizing the relay to close the magnet circuit to move the plunger in the opposite direction, means including a second contactor operable by the plunger for holding the relay switch closed during actuation of the plunger, and means for returning the plunger to again re-establish current through the sets of contacts.

9. A motor of the character described including an electromagnet, a plunger reciprocable by the magnet, a circuit for energizing the magnet, a relay controlled switch in the circuit, a circuit for operating the relay, spaced plates adjacent the plunger and connected in the relay circuit, contacts carried by the plates, a contactor on the plunger adapted to connect the contacts to energize the relay for closing the magnet circuit to move the plunger in one direction, and means for moving the plunger in the opposite direction.

10. A motor of the character described including an electromagnet, a plunger operable by the magnet in one direction, a circuit for energizing the magnet, a relay controlling the magnet circuit, sets of contacts in the relay circuit, a contactor on the plunger to connect the sets of contacts for initially energizing the relay circuit for energizing the magnet circuit to move the plunger, a second contactor operable by the plunger for maintaining the magnet circuit closed during actuation of the plunger, and means for moving the plunger in the opposite direction.

11. A motor of the character described including an electromagnet, a plunger reciprocable by the magnet, a circuit for energizing the magnet, a relay controlled switch in the circuit, a relay circuit for operating the switch, spaced plates adjacent the plunger and connected in the relay circuit, contacts yieldably supported by the plates, and a contactor on the plunger to connect the contacts for energizing the relay to close the magnet circuit for moving the plunger in one direction, and means for moving the plunger in the opposite direction.

12. A motor of the character described including an electromagnet, a plunger reciprocable by the magnet, a circuit for energizing the magnet, a switch in the circuit, a relay circuit for operating the switch, spaced plates adjacent the plunger and connected in the relay circuit, contacts slidable in the plates, means for urging the contacts in one direction, and a contactor on the plunger to connect the contacts and energize the relay circuit for closing the magnet circuit to move the plunger in one direction, and means for moving the plunger in the opposite direction.

13. A motor of the character described, an electromagnet, a plunger reciprocable by the magnet, a circuit for energizing the magnet, a relay controlled switch in the circuit, a circuit for operating the relay, a contact member connected with a source of current supply, a second contact member connected with the relay circuit, and a contactor on the plunger to connect the contact members and energize the relay circuit for closing the energizing circuit to move the plunger in one direction, and means for moving the plunger in the opposite direction.

14. A motor of the character described including a magnetizing solenoid, an electric circuit for energizing the solenoid, an armature moved in one direction by said solenoid, means for moving the armature in the opposite direction, a circuit for demagnetizing said solenoid to permit movement of the armature in said opposite direction, a relay controlling the demagnetizing circuit, and a switch operable by the armature for controlling said relay.

15. A motor of the character described including a magnetizing solenoid, an electric circuit for energizing the solenoid, an armature moved in one direction by said solenoid, means for moving the armature in the opposite direction, a circuit for demagnetizing said solenoid to permit movement of the armature in said opposite direction and including a rheostat to control the beginning of said movement, a relay controlling the demagnetizing circuit, a switch operable by the armature for initially closing the relay circuit, and a second switch controlled by the armature for maintaining the relay circuit closed during movement of the armature.

16. A motor of the character described including a magnetizing solenoid, an electric circuit for energizing the solenoid, an armature moved in one direction by said solenoid, electrically operated means for moving the armature in the opposite direction, an electric circuit including a demagnetizing coil surrounding said solenoid to permit movement of the armature in said opposite direction, a relay controlling the demagnetizing circuit, and a switch operable by the armature for controlling said relay.

In testimony whereof we affix our signatures.

IRWIN B. WINSOR.
MOSES A. DEAL.